United States Patent [19]

Anstey

[11] 4,428,282
[45] Jan. 31, 1984

[54] CYLINDRICAL BALER WITH SELF-CLEANING DRIVE ROLLER

[75] Inventor: Henry D. Anstey, Ottumwa, Iowa

[73] Assignee: Deere & Company, Moline, Ill.

[21] Appl. No.: 382,882

[22] Filed: May 28, 1982

[51] Int. Cl.³ .............................................. B30B 5/06
[52] U.S. Cl. ......................................... 100/88; 56/341
[58] Field of Search ................. 100/87, 88, 5; 56/341, 56/342, 343; 198/817, 842, 843

[56] References Cited

U.S. PATENT DOCUMENTS

| | | | |
|---|---|---|---|
| 1,050,400 | 1/1913 | Steele | 198/817 |
| 3,125,948 | 3/1964 | Redding | 100/88 |
| 4,023,479 | 5/1977 | McAllister et al. | 100/88 X |
| 4,150,527 | 4/1979 | Meiers | 56/341 |
| 4,172,355 | 10/1979 | Blanshine | 100/88 X |
| 4,182,101 | 1/1980 | Gaeddert et al. | 56/341 |
| 4,252,057 | 2/1981 | Gaeddert et al. | 100/88 |

OTHER PUBLICATIONS

U.S. Patent Appliction Ser. No. 285,178 filed Jul. 20, 1981 in the name of Viaud, entitled Staggered Rolls and Belts for Round Baler.
U.S. Patent Application Ser. No. 308,223 filed Oct. 5, 1981 in the name of Koning et al., entitled Belt Tensioning System for Round Balers.
Parts Catalog PC1896 (Nov.–5–81) for the John Deere Model 410 and 510 Round Baler, p. 38.

Primary Examiner—Peter Feldman

[57] ABSTRACT

A baler is comprised of a frame, a plurality of belts supported on a plurality of rollers in the frame. The belts define a bale forming chamber for forming cylindrical bales. One of the rollers at the lower front of the bale forming chamber has a plurality of sleeves thereon each underlying a respective one of the belts and supporting the longitudinal edges of the belts out of contact with the core of the roller. By supporting the longitudinal edges of the belts out of contact with roller core, the tendency of the roller to become wrapped with crop material is reduced.

6 Claims, 5 Drawing Figures

CYLINDRICAL BALER WITH SELF-CLEANING DRIVE ROLLER

CROSS REFERENCE TO RELATED APPLICATIONS

U. S. Pat. application, Ser. No. 382,886 filed simultaneously herewith in the names of Anstey et al, entitled CYLINDRICAL BALER WITH SUBSTANTIALLY ENCLOSED BALE FORMING CHAMBER and assigned to the assignee of the invention herein is directed to a cylindrical baler having a plurality of side-by-side belts supported on a plurality of rollers. The belts define an expandable bale forming chamber for forming cylindrical bales. The belts are sized and spaced so as to enclose at least 80% of the distance between the sidewalls of the baler. The invention disclosed and claimed in application Ser. No. 382,886 is disclosed herein in Section II solely for the purpose of completeness of the description of the operative environment of the invention claimed herein and thus forms no part of the invention claimed herein.

U.S. Pat. application, Ser. No. 382,885 filed concurrently with this application in the name Soteropulos, entitled CYLINDRICAL BALER WITH SELF CLEANING GATE and assigned to the assignee of the invention herein is directed to a cylindrical baler having a bale discharge gate with openings formed in the sidewalls of the gate. The openings permit the gate to be self cleaning thereby reducing plugging and roller wrapping problems. The invention disclosed and claimed in application Ser. No. 382,885 is disclosed herein in Section IV solely for the purpose of completeness of the description of operative environment of the invention claimed herein and thus forms no part of the invention claimed herein.

U.S. Pat. application, Ser. No. 285,178 filed July 20, 1981, in the name of Viaud, entitled STAGGERED ROLLS AND BELTS FOR ROUND BALER, and assigned to the assignee of the invention herein is directed to a cylindrical or round baler having a plurality of belts supported on a plurality of rollers. The belts define an adjustable bale forming chamber. Certain of the belts and rolls are arranged in a staggered array to prevent crop buildup in volumes contiguous with the bale forming chamber. The invention disclosed and claimed in application Ser. No. 285,178 is disclosed herein in Section I solely for the purpose of completeness of description of the operative environment of the invention claimed herein and thus forms no part of the invention claimed herein. The disclosure of the application Ser. No. 285,178 is hereby incorporated by reference herein.

U.S. Pat. application, Ser. No. 308,223, filed Oct. 5, 1981 in the name of Koning et al, entitled BELT-TENSIONING SYSTEM FOR ROUND BALERS and assigned to the assignee of the invention herein is directed to a cylindrical baler having a plurality of side-by-side belts supported on a plurality of rollers. The belts define the bale forming chamber. A belt tensioning and takeup mechanism is used to control the tension in the belts and the size of the bale forming chamber. The invention disclosed and claimed in application Ser. No. 308,223 is disclosed herein in Section I solely for the purpose of completeness of description of the operative environment of the invention claimed herein and thus forms no part of the invention claimed herein. The disclosure application Ser. No. 308,223 is hereby incorporated by reference herein.

U.S. Pat. application, Ser. No. 382,883 filed simultaneously herewith in the name of Frimml, entitled CYLINDRICAL BALER WITH FLARE SHEETS ON CROP PICKUP and assigned to the assignee of the invention herein, is directed to a cylindrical baler with flare sheets on the crop pickup mounted underneath the baler frame. The invention disclosed and claimed in Ser. No. 382,883 is disclosed herein in Section I solely for the completeness of description of the operative environment of the invention claimed herein and thus forms no part of the invention claimed herein.

BACKGROUND OF THE INVENTION

This invention relates to a baler for producing cylindrical ("round") bales comprising a plurality of endless belts for forming an adjustable bale forming chamber and more particularly relates to guide rollers used to support such belts.

Prior art balers of the foregoing type are comprised generally of a plurality of side-by-side, longitudinally extending belts supported on a plurality of transverse rollers. An expandable bale forming chamber is defined by the sides of the balers, the rollers and the belts. A long standing problem encountered in the use of such balers is caused by crop material becoming entrapped within volumes contiguous with the bale forming chamber and substantially enclosed by the sides of the baler, the rollers and the belts. The crop enters these volumes from the bale forming chamber by passing through spaces between longitudinally adjacent belts. When the crops become entrapped within these volumes, it tends to wrap around the rollers which is detrimental to proper belt tracking on the rollers and tends to retard enlargement of the bale forming chamber as the bale grows in diameter. Eventually, if uncorrected, the belts become bound (or may even break) and bale formation is no longer possible until the wrapped and entrapped hay is removed.

Also, crop material has a tendency to become entwined around belt guide rollers which engage the belts at locations in contact with the bale during formation. The crop material in the chamber extends through gaps between longitudinally adjacent belts and can become wedged into a pinch point formed between a belt and the roller. Because the belt and the roller are driven, the interaction thereof with the crop tends to wrap the crop material around the roller. The wrapping of the roller can lead to poor belt tracking, the binding of the belts and even belt breakage.

A number of solutions to mitigate the effect of these problems have been proposed. For example, U.S. Pat. No. 3,125,948 discloses a cylindrical baler with a cleaner bar located parallel to and in a closely spaced relationship to an upper drive roller to prevent the wrapping of the drive roller with crop material. U.S. Pat. No. 4,182,101 discloses a cylindrical baler with a bale positioning roller located parallel to and closely adjacent a belt guide roller which is normally subject to wrapping problems. The bale positioning roller prevents the bale from resting on the belt guide roller and forming a pinch point between the belt and the belt guide roller, the formation of which is said to be conducive to roller wrapping. In addition, the bale positioning roller has a plurality of projections which extend between adjacent belts and pull crop material away from the belt guide roller to minimize wrapping. The latter design has been found to have the disadvantage of producing a bale with a ragged exterior surface because the bale rides on the bale positioning roller which has a plurality of projections.

SUMMARY OF THE INVENTION

Accordingly, it is an objective of this invention to provide an improved baler which is less subject to plugging and to wrapping of the belt guide rollers for a wide variety of crops and crop conditions.

Another object of the invention is to provide an improved baler which is less subject to accumulation of crop material in volumes contiguous with the bale forming chamber and therefore requires less cleaning and maintenance.

Another object of the invention is to provide an improved baler which has a belt guide roller less subject to wrapping and which, at the same time, produces a bale having a relatively smooth periphery.

These and other objects of the invention which will be apparent from a consideration of the following detailed description are accomplished by a baler comprising a frame, a plurality of rollers rotatably supported in the frame and a plurality of endless, side-by-side, flexible belts supported on the roller and defining an expandable bale forming chamber. The belts includes a span for engaging the outer surface of a bale during formation. In accordance with the improvement of this invention, one of the rollers engaging the span includes means for supporting the longitudinal edges of each of the belts normally out of contact with said one roller. The supporting means is preferably a plurality of sleeves fixed to the cylindrical core of the roller. One sleeve underlies a respective one of the belts and is narrower than the width of the belt overlying the sleeve. By holding the longitudinal edges of each belt out of contact with the core of the roller, the sleeve reduces the tendency of crop material to wrap around the roller. The reduced tendency is believed to be explained by the fact that ends of the crop material are less subject to being caught and held under the edge of the belt as it passes aroung the roller.

In accordance with a preferred embodiment of the invention, the roller is located at the lower front of the bale forming chamber at a location adjacent to the entrance into the chamber. A span of the belts is looped under the roller and is drivable in a direction to move the span from the bale in the chamber to the roller. The bale is normally supported on this roller during a large portion of the bale forming cycle. A roller in this location has been found to have a relatively high tendency to become wrapped with crop material. This is believed to be due to the fact that a pinch point is formed between the roller and the belt looped under the roller which tends to catch the ends of crop material in the bale forming chamber and cause it to wrap. By supporting the longitudinal edges of the belt, in accordance with the features of this invention, this tendency is markedly reduced.

DESCRIPTION OF THE PREFERRED EMBODIMENT

I. General

Figure 1:
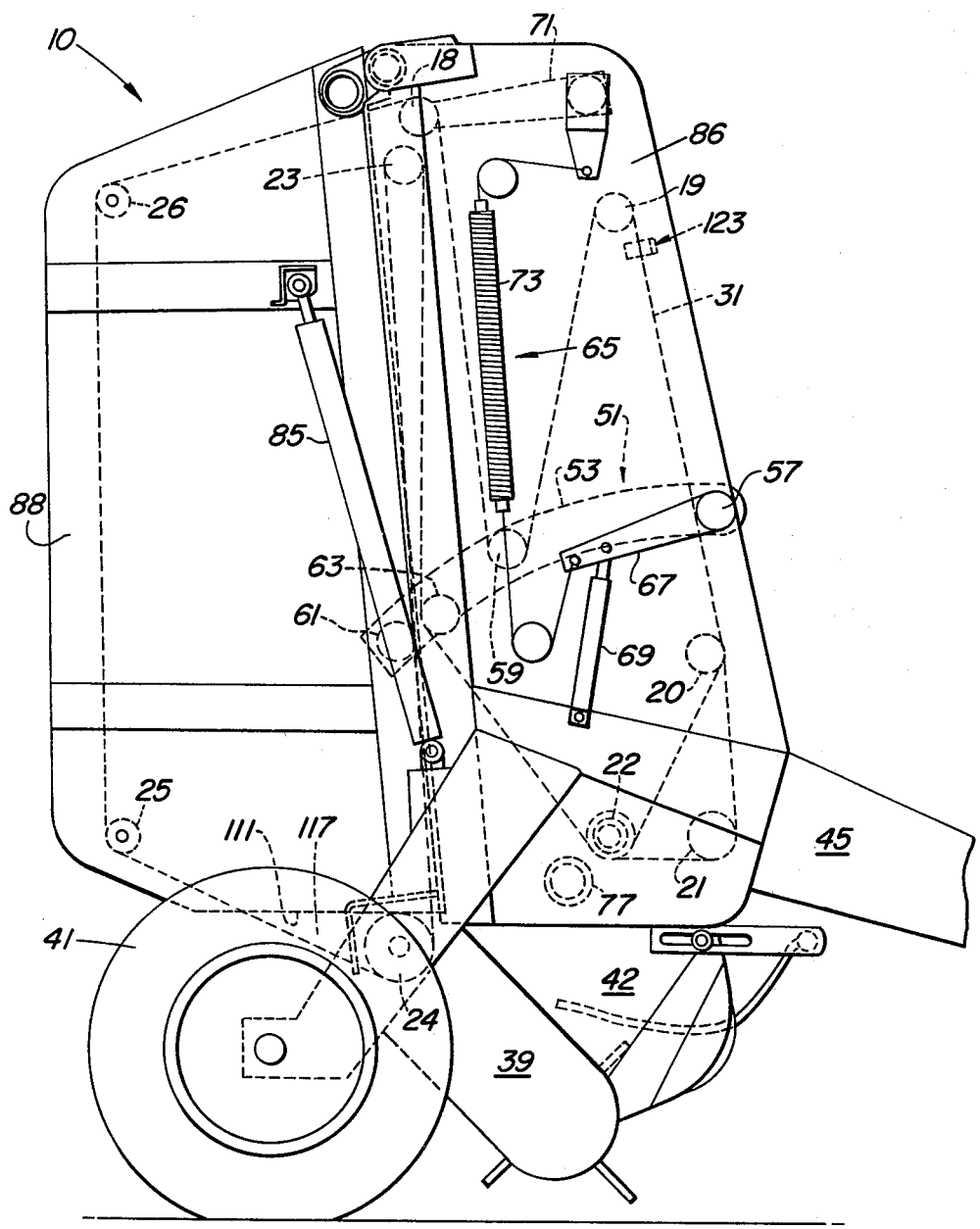
FIG. 1 is an elevational view of the right side of a baler in accordance with the features of this invention. Certain nonessential components (e.g. external shielding) are omitted for simplicity and clarity.

Reference is now made to FIGS. 1-4, which illustrate a preferred embodiment of a baler in accordance with features of this invention. The baler is generally comprised of a frame 10 with a pair of opposed sidewalls 13, 15; a plurality of rollers 18-26 rotatably mounted on and extending between sidewalls 13, 15; a plurality of endless, side-by-side belts 31-38 supported on guide rollers 18-26 and defining between sidewalls 13, 15 an expandable bale forming chamber 40 for forming cylindrical bales and a crop pickup 39 for feeding crop material from the ground into bale forming chamber 40. A pair of flare sheets 42 (only one shown) is mounted on the respective ends of pickup 39 and is the subject of the application Ser. No. 382,885 cross referenced above. The baler frame 10 is supported on wheels 41 (only one shown) and is drawn behind a tractor (not shown) via a draft tongue 45.

Belts 31-38 include a pair of generally upwardly oriented, opposed spans or segments 47, 49 which form chamber 40 and extend between roller 61 and roller 24 and between roller 63 and roller 22, respectively. As shown in FIG. 2 the size of chamber 40 and the length of spans or segments 47, 49 are adjustable to accommodate the increasing diameter of a bale 50 during formation by a belt take-up and tensioning mechanism 51. Belt take-up and tensioning mechanism 51 is fully disclosed in U.S. Pat. application Ser. No. 308,223, cross referenced above, forms no part of the invention herein and will only be briefly described herein for convenience. Mechanism 51 includes a pair of arms 53, 55 pivotally mounted on a support 57, a take up and tensioning roller 59 supported between arms 53, 55 and a pair of chamber restricting rollers 61, 63 supported between arms 53, 55. Take-up and tensioning mechanism 51 is biased in a counterclockwise direction (FIG. 2) by a pair of bias mechanisms 65 on each side of the baler (only one shown in FIG. 1) including bias arm 67 fixed to one end of support 57, hydraulic cylinder 69, bell crank 71 and spring 73 interconnected between crank 71 and bias arm 67.

As shown in FIG. 2 crop material is fed into bale forming chamber 40 through an open or unrestricted entrance 75 without substantial compaction by pickup 39. Entrance 75 is defined by the lowermost opposed belt guide rollers 24, 22, crop pickup 39 and a stripper roller 77. Stripper roller 77 aids in initiation of a bale core, partially supports the weight of the bale during formation and strips hay from belt segment 49 to prevent the loss of crop material from chamber 40.

Figure 4:
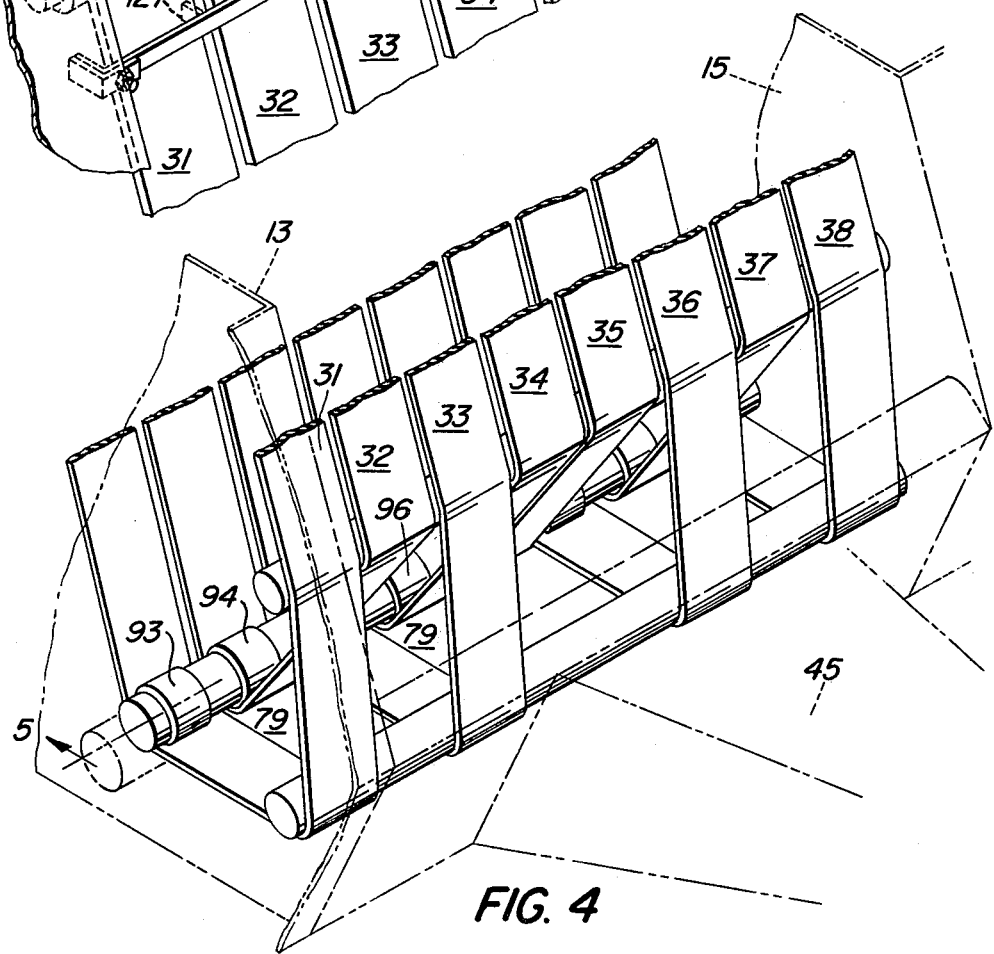
FIG. 4 is a fragmentary perspective view of a lower front portion of the baler of FIG. 1.

Belts 31-38 are driven in the direction of arrows 72, 74 by driving drive rollers 19, 22 through a conventional driven train (not shown) connected to the power take-off shaft of the tractor (not shown) used to pull the baler. As shown in FIGS. 2 and 4 herein and as described in U.S. Pat. application Ser. No. 285,178, cross referenced above and incorporated by reference herein, belts 31-38 are arranged in a staggered manner on guide rollers 24, 25 to form opening or spaces 79 through which crop material may escape before causing roll wrapping or buildup of trapped crop material within volumes such as volume 81 contiguous with bale forming chamber 40. The staggered belt and roller feature forms no part of the invention herein and has therefore been only briefly described.

Referring again to FIG. 1 each side sheet 13, 15 is comprised of front sections 86, 87 and rear sections 88, 89 respectively. Rear sections 88, 89 and rollers 24-26 constitute a bale discharge gate 82. Gate 82 is pivotally movable relative to front sections 86, 87 about a pivot 83 by actuation of a pair of hydraulic cylinders 85 (only one shown) for ejection of bale 50 (when completed) from chamber 40.

A belt guide member 123 (FIGS. 1 and 3) is fixed between sidewalls 13, 15 and comprises a plurality of guide bars 127-133 which are positioned respectively between adjacent ones of belts 31-38 to aid in maintaining proper belt alignment and tracking on guide rollers 18-26.

In operation, a bale is formed in the baler by pulling the baler through a field with a tractor. Crop material is picked up from a windrow on the ground by the crop pickup 39 and is fed upwardly without substantial compaction through open entrance 75 into chamber 40. The crop material is engaged with upwardly moving belt segment 47 and begins to turn in a clockwise direction (FIG. 2) where it is engaged by downwardly moving belt segment 49. When the crop material reaches the lowermost portion of belt segment 49, it is engaged by stripper rollers 77 rotating in a counterclockwise direction. Roller 77 tends to continue the rotation of crop material in a clockwise direction and into engagement with additional crop material being fed into chamber 40 through opening 75 thereby initiating the formation of a bale core. As the bale core increases in diameter, it becomes compacted by the tension in the belts until the tension in the belts imposed by belt tensioning and takeup mechanism 51 and bias means 65 is exceeded and arms 53, 55 along with rollers 59, 61, 63 are pushed in a clockwise direction. With the upward movement of rollers 59, 61, 63, belt segments 47, 49 are lengthened, thereby increasing the diameter of chamber 40. The size of the bale forming chamber 40 continues to increase as the diameter of the bale 50 increases and overcomes the tension imposed on the belts by springs 73 and cylinders 69. The tension on the belts is also adjustable to control bale density by the exchange of fluid between the upper and lower end of cylinders 69 via an adjustable relief valve (not shown). When bale 50 reaches a predetermined diameter, cylinders 85 are actuated to open bale discharge gate 82 to drop bale 50 on the ground.

II. Bale Forming Chamber

In accordance with the features of the invention herein, bale forming chamber 40 has sides which are substantially enclosed by belts 31-38. Belts 31-38 are sized and spaced to enclose at least 80%, and preferably over 90%, of the space between sidewalls 13, 15. The spacing of the belts is such that only sufficient room remains for the location of narrow bar-shaped belt guides 127-133 to be positioned between adjacent belts. The guides aid in maintaining proper belt tracking and alignment of the belts on the rollers. By substantially enclosing the chamber with the belts, it is believed that (1) less crop material escapes from the chamber to become entrapped and possibly plug volumes contiguous with the chamber and (2) smaller segments of the guide rollers are exposed to crop material thereby reducing the potential for wrapping of the material on the rollers.

For example, in a preferred embodiment of a baler in accordance with the invention, the spacing between the sidewalls 13, 15 is 117 cm. Six belts which are 17.8 cm in width, (7 inches) are spaced between sidewalls 13, 15. Belts 31, 38 are spaced inwardly from sidewalls 13, 15, respectively, a distance of 2.0 cm and each belt is spaced a distance of about 1.28 cm from the immediately adjacent belt on each side. Each belt guide bar 127-133 is 0.5 cm in thickness. With belts of this size and spacing, about 91% of the distance between sidewall 13, 15 is enclosed.

In accordance with another preferred embodiment, the following dimensions are used: Sidewall spacing—156.5 cm; number and size of belts—8 belts each 17.8 cm in width; spacing of sidewalls 13, 15 from immediately adjacent belts 31, 38—2.0 cm; spacing of each belt from immediately adjacent belt—1.45 cm; belt guide bar thickness—0.5 cm; and percentage of sidewall spacing enclosed by belts about—91%.

In the disclosed baler, it has been found that the substantial enclosure of the bale forming chamber has led to an improved ability to bale a wide variety of crops (for example, hay, straw and other residue crops) at any field moisture condition and under a wide variety of other crop conditions with a reduced tendency for plugging or binding of the bale forming chamber and wrapping of the guide rollers 18-26 with crop material. In particular, the baler is able to bale hay with a moisture content from 10% up to 70 and 80%. Standing hay has a moisture content between 70 and 80%, thus the baler is useable to bale hay immediately after cutting. This has been found to be useful, for example in England, where it is sometimes the practice to bale hay (e.g. rye grass) immediately after cutting and to place the bale in a plastic enclosure to produce ensilage. With prior art balers, the baling of hay at moisture levels between 25 and 50% are generally considered to be troublesome. The baling of low moisture hay and straw with prior art baler is also recognized as being extremely difficult because the crop tends to break into small pieces and to collect in volumes adjacent to the bale forming chamber. The baler discloseed herein is able to bale such material with a significantly reduced tendency for plugging.

III. Self-Cleaning Drive Roller

Figure 5:
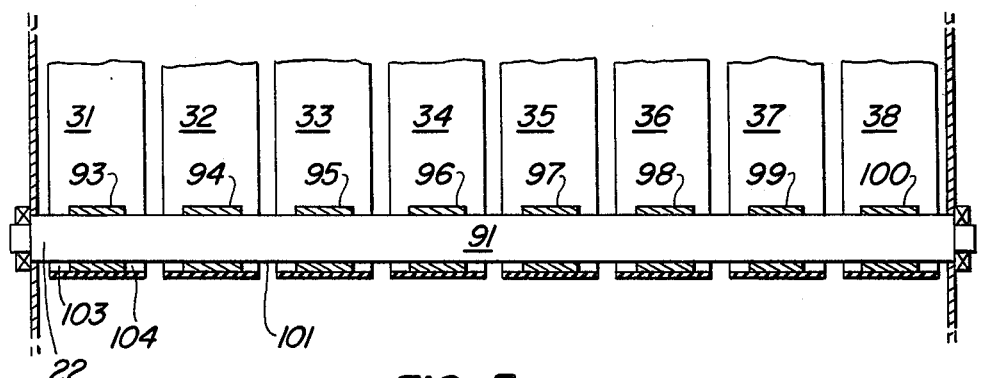
FIG. 5 is a longitudinal, fragmentary, cross-sectional view taken along lines 5—5 of FIG. 4 and illustrating the drive roller of the baler.
Figure 3:
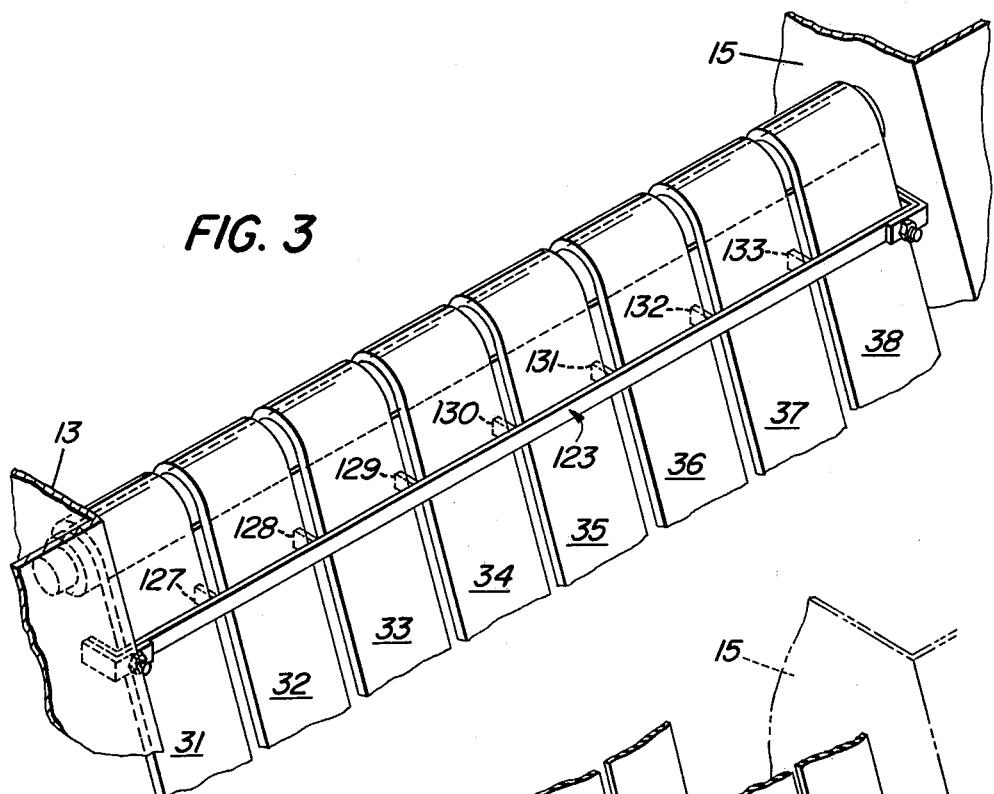
FIG. 3 is a fragmentary perspective view of an upper front portion of the baler of FIG. 1.

Reference is now made to FIGS. 2, 4 and 5 (particularly FIGS. 4 and 5) which illustrate a preferred embodiment of a baler with a self-cleaning drive roller 22 in accordance with the features of invention disclosed and claimed in this application.

Drive roller 22 is comprised of a cylindrical core 91 (e.g., steel) and means for supporting the longitudinal edges of belts 31-38 out of contact with the surface 101 of core 91. The supporting means is here shown as being constituted by a plurality of rubber sleeves 93-100 bonded to the exterior surface 101 of the core 91.

It will be recognized that the supporting means may be constituted by any type of elevated surface for supporting the central portion (or portions thereof) of each belt such that the belt edges are normally out of contact with the core. For example, the core could be cast with a plurality of spaced elevated surfaces. The elevated surface under each belt may be continuous or discontinuous.

Each sleeve 93-100 is positioned on roller core 91 so as to lie beneath a respective one of belts 31-38. The width of the belts 31-38 and the width of the underlying sleeves 93-100 are chosen such that each belt extends beyond the sleeve lying thereunder and thereby forms a pair of gaps 103, 105, bounded by the exterior surface 101 of core 91, the inner surface of the belt and the outer edge of the sleeve. By way of example in a preferred embodiment, the belts are 17.8 cm in width and the sleeves are 12.7 cm. in width leaving a gap of about 2.5 cm in length. The thickness of the sleeve is 0.32 cm, providing a gap of less than 0.32 cm in height (between core surface 101 and the inner surface of a belt) because the cantilevered portion of the belts tends to bend toward the core surface 101. The thickness of sleeves 93-100 should be sufficient to provide and maintain a gap. The thickness will vary for different belt materials.

It has been found that with a sleeve underlying each belt on roller 22, there is a significantly reduced tendency for crop material to wrap around roller 24. Without the sleeve the bale (at least during a portion of the bale formation cycle) rests on roll 22 and squeezes the span 49 against roller 22 so that crop material passing between belts 31-38 from chamber 40 can become wedged into the pinch point between segment 49 and roller 22. By the information of gaps such as gaps 103, 105 adjacent the edge of each belt as it passes around roller 22, the formation of a pinch point is avoided to a great extent and there is a significant reduction in the tendency of crop material to become wedged and become bound under the edge of the belts. Although some crop material still passes between adjacent belts 31-38, it may fall through spaces 79 formed by the staggered arrangement of the belts 31-38 on rollers 21, 22. In addition, since there is a much reduced tendency of the ends of crop material to become bound under the edges of the belts, the hay has a greater tendency not to be pulled or peeled from the bale being formed in the chamber, thereby reducing crop loss. Furthermore, this feature significantly contributes to the trouble-free baler operation by reducing the tendency of crop material to become entwined around roller 22 which can lead to belt breakage and poor belt tracking for a wide variety of crops and crop conditions. This is particularly advantageous for the baling of a crop such as high-moisture hay and extremely low moisture hay or straw where there is a significant tendency of the crop to accumulate around the belt guide rollers and eventually bind and plug the belts. It will be recognized that belt guide rollers (e.g., roller 61), other than roller 22, which have a tendency to wrap with crop material may be provided with means for supporting the belt edges. This tendency has been primarily identified with rollers which engage the belts at locations in contact with the bale during formation.

IV. Self-cleaning Gate

Figure 2:
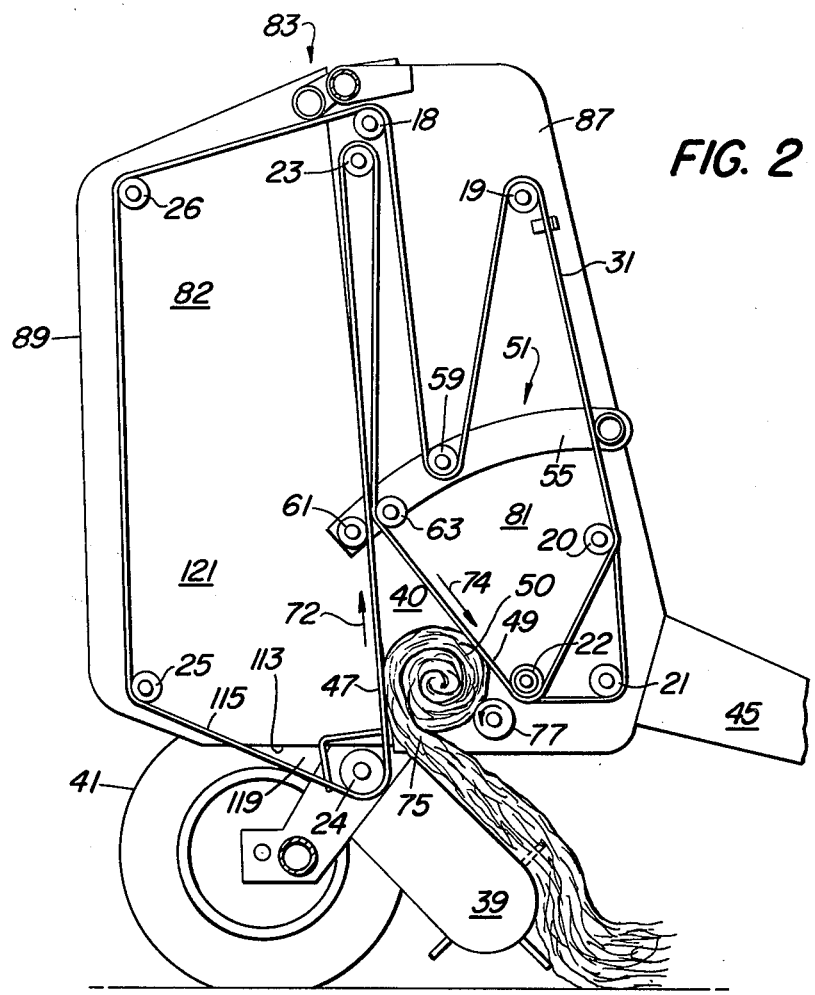
FIG. 2 is an elevational view of the right side of the baler of FIG. 1 with the right sidewall removed to expose the internal components and with a partially formed bale in the bale forming chamber.

Reference is now made to FIGS. 1 and 2 which illustratge a preferred embodiment of a baler with a self-cleaning gate as disclosed and claimed in U.S. patent application Ser. No. 382,885 cross referenced above.

Gate 82 is comprised of rear sidewall sections 88, 89 and guide rollers 24-26 supported therebetween. Gate 82 is pivotally mounted about a pivot 83 for rearward movement away from sidewall sections 86, 87 and the rollers supported therebetween to permit the discharge of a bale. Rollers 24, 25 are mounted adjacent lower edges 111, 113. A segment 115 of belts 31-38 extending between rollers 24, 25 extends below portions of lower edges 111, 113 to provide a pair of openings 117, 119 on each side of the baler. Openings 117, 119 lead into a volume 121 defined by the belt spans extending around rollers 23-26 and rear sidewalls 88, 89. Openings 117, 119 allow crop material to fall out and not accumulate in volume 121. Crop material in the bale forming operation enters region 121 from chamber 40 by passing between adjacent belts 31-38 and can lead, if left to accumulate, can lead to wrapping and binding of the belt guide rollers and sometimes belt breakage.

The use of gate openings 119, 117 has particular utility when the bale forming chamber is substantially enclosed by belts 31-38 as disclosed in Section II above. In this instance, when crop material begins to accumulate on belt segment 115, there is a greater tendency for the crop to become entrapped and not fall between adjacent belts onto the ground because of the close spacing of the belts. This feature further contributes to the operation of the baler for a wide variety of crops and crop conditions and in particular for baling a crop such as high-moisture hay and extremely low moisture hay or straw. It has been found that under most circumstances, crop material will fall through openings 117, 119 automatically during the baling operation thereby retaining the amount of crop material accumulated in volume 121 to a level which does not degrade functional performance of the baler.

The invention herein has been described in connection with certain preferred embodiments thereof. Other modifications and embodiments of the invention will be apparent to those skilled in the art. Accordingly, it is intended that the appended claims cover all such modifications and embodiments as are within the true spirit and scope of the invention.

I claim:
1. In a baler for forming a cylindrical bale off the ground comprising:
    a pair of spaced sidewalls;
    a guide roller extending between said sidewalls; and
    a plurality of longitudinally extending, side-by-side belts transversely spaced between said sidewalls, defining a bale-forming chamber, and including a span looped below said roller, said span normally engaging the periphery of the bale during formation and drivable in a direction to move said span from the bale to said roller; the improvement wherein said roller comprises:
    means for supporting the longitudinal edges of each of said plurality of belts out of contact with said roller to form a gap between the edges and the roller.

2. In a baler comprising:
    a frame including a pair of spaced sidewalls;
    a plurality of guide rollers rotatably supported in said frame and extending between said sidewalls;
    a plurality of endless, side-by-side, longitudinally extending, flexible belts transversely spaced between said sidewalls, supported on said rollers and defining an expandable bale forming chamber, said belts include a span for engaging the outer surface of a bale during formation;
    one of said rollers engaging said span at a location engaged with said bale for at least a portion of the time during formation; the improvement comprising:

said one roller having means for supporting the longitudinal edges of each of said belts out of contact with said one roller to form a gap between the edges and said one roller.

3. The baler of claims 1 or 2 wherein said supporting means is plurality of sleeves, one of said sleeves underlying a corresponding one of said belts.

4. The baler of claim 3 wherein each said sleeve is narrower than the width of the corresponding belt overlying each said sleeve.

5. The baler of claim 4 wherein said one roller is located at the lower front of the bale forming chamber;

a bale being formed in said chamber is normally supported in part by said roller during at least a portion of the bale formation; and said span and said one roller form a downwardly narrowing pinch point.

6. In a baler comprising:

a frame including a pair of opposed sidewalls;

a plurality of rollers extending between said sides;

a plurality of side-by-side longitudinally extending belts supported on and extending around said rollers, said belts transversely spaced between said sidewalls, and said belts and rollers defining an expandable bale forming chamber for forming cylindrical bales; the improvement wherein one of said rollers comprises:

a longitudinal core; and a plurality of sleeves axially spaced on said core, each of said sleeve underlying respectively a corresponding one of said plurality of belts, each said sleeve being narrower than the width of the corresponding belt overlying said sleeve and supporting the longitudinal edges of the corresponding belt out of contact with said core.

* * * * *